US006978257B1

(12) United States Patent
Halbout et al.

(10) Patent No.: US 6,978,257 B1
(45) Date of Patent: Dec. 20, 2005

(54) SYSTEM AND METHOD FOR MEASURING AND PRICING MIDRANGE COMPUTER SERVER OUTSOURCING SERVICES

(75) Inventors: Jean-Marc Halbout, Larchmont, NY (US); Stephen T. Huhn, Tarrytown, NY (US); Thomas J. Kramer, Fairfax Station, VA (US); Daniel J. Mathias, Jr., Ballston Lake, NY (US); Richard F. Miskovitz, Pawling, NY (US); Edward Plavchak, Carmel, IN (US); Joel Penfield Read, Chatham, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/494,643

(22) Filed: Jan. 31, 2000

(51) Int. Cl.[7] ............................................. G06F 17/60
(52) U.S. Cl. ........................ 705/400; 705/34; 709/223
(58) Field of Search ................................ 705/1, 30, 34, 705/52, 53, 59, 400, 418; 709/220, 223, 228

(56) References Cited

U.S. PATENT DOCUMENTS

| | | | | |
|---|---|---|---|---|
| 5,668,995 | A | * | 9/1997 | Bhat ........................... 718/104 |
| 5,761,091 | A | * | 6/1998 | Agrawal et al. ............. 702/186 |
| 5,790,170 | A | * | 8/1998 | Suzuki ........................... 725/1 |
| 5,878,400 | A | * | 3/1999 | Carter, III ..................... 705/20 |
| 5,978,577 | A | * | 11/1999 | Rierden et al. ......... 379/114.25 |
| 6,086,618 | A | * | 7/2000 | Al-Hilali et al. ............. 709/226 |
| 6,208,977 | B1 | * | 3/2001 | Hernandez et al. ......... 705/400 |
| 6,314,465 | B1 | * | 11/2001 | Paul et al. ................... 709/217 |
| 6,338,046 | B1 | * | 1/2002 | Saari et al. ................. 705/400 |

FOREIGN PATENT DOCUMENTS

JP   11-088505 A   *   3/1999

OTHER PUBLICATIONS

Efficient ESA/370 Read Channel Programming, Oct. 1, 1992, IBM Technical Disclosure Bulletin, vol. 35, Issue 5, pp. 107-115.*
Buzzard, James, "The client-server paradigm: making sense out of the claims", 08-1990, Dialog file, v8, n8, p72(8).*
Unknown Author, Erol's Structure of Fees, Feb. 1998, 1 page, available at http://web.archive.org/web/19980215050909/www.erols.com/erols/index/price/htm.*
Catchings et al., "What's the right size?", Jun. 1992, Corporate Computing, v1, n1, p 86 (6 pages).,*
Nick Develin, "Unlocjing Value in the IT Function.", Jun. 1998, Management Accounting (British), v76, n6, p46(3).*

* cited by examiner

*Primary Examiner*—John W. Hayes
*Assistant Examiner*—Richard Woo
(74) *Attorney, Agent, or Firm*—JoAnn Kealy Crockatt; Anne Vachon Dougherty

(57) ABSTRACT

A server support matrix system and method for measuring and pricing information technology services provided by small, midrange and large servers. The inventive system and method assigns capacity units to server systems based on size and applies the capacity units to categorize server systems for valuation. In addition, the inventive system and method provides for taking into account server application complexity, in the assignment of a usage type category, and different levels of support services which can be provided by the service provider. The variables of capacity unit, usage type and support service level are combined in a Server Support Matrix and are assigned costs based on their location in the matrix. The matrix allows service providers and customers to readily ascertain prospective charges and to project costs for next-generation servers.

7 Claims, 2 Drawing Sheets

| CAPACITY UNIT RANGE | CAPACITY UNIT CATEGORY (CUC) |
|---|---|
| 0.1-9.9 | 1 |
| 10.0-49.9 | 2 |
| 50.0-99.9 | 3 |
| 100.0-249.9 | 4 |
| 250.0-400.0 | 5 |

FIG.3

| CU CATEGORY (CUC) | SUPPORT LEVEL | USAGE TYPE A | B | C |
|---|---|---|---|---|
| 1 | BASE | X | X | X |
|   | STANDARD | X | X | X |
|   | ENHANCED | X | X | X |
|   | PREMIUM | X | X | X |
| 2 | BASE | X | X | X |
|   | STANDARD | X | X | X |
|   | ENHANCED | X | X | X |
|   | PREMIUM | X | X | X |
| 3 | BASE | X | X | X |
|   | STANDARD | X | X | X |
|   | ENHANCED | X | X | X |
|   | PREMIUM | X | X | X |
| 4 | BASE | X | X | X |
|   | STANDARD | X | X | X |
|   | ENHANCED | X | X | X |
|   | PREMIUM | X | X | X |
| 5 | BASE | X | X | X |
|   | STANDARD | X | X | X |
|   | ENHANCED | X | X | X |
|   | PREMIUM | X | X | X |

FIG.4

SYSTEM AND METHOD FOR MEASURING AND PRICING MIDRANGE COMPUTER SERVER OUTSOURCING SERVICES

FIELD OF THE INVENTION

This invention relates to the outsourcing of computer services and more particularly to a system and method for measuring and weighing the value of outsourcing services for computer servers.

BACKGROUND OF THE INVENTION

The outsourcing of computer services has become increasingly common, given the necessity of utilizing specialized resources in order to efficiently respond to all of a customer's demands. A challenge to outsourcing, however, is finding an appropriate system and method for assessing the value of the computer services which are provided to the customer by the outside source or sources. In the realm of mainframe servers, service providers have applied a "utilization model" which links CPU hours to a billing system. Since a mainframe is generally dedicated exclusively to the tasks of one customer and can readily track its number of hours of CPU operation and report same for billing, the utilization model is rather straightforward. A service provider who supplies usage of a mainframe server can establish a baseline of CPU hours or minutes consumed per month and charge the customer a fixed rate for that number of hours or minutes. Typically, the mainframe provider will additionally establish a "protection band" of a preset number of hours or minutes above and below the baseline, which allows the customer's CPU consumption to vary within the protection band without requiring a billing adjustment. Variation of usage beyond the boundaries of the protection band, whether above or below the stated number of hours, will result in an adjustment of the monthly bill based upon an agreed incremental rate for each hour above or below the boundaries of the protection band.

Due to several factors, the outsourcing of services for servers is not as readily quantified and billed using the above-described utilization model. One factor is that individualized software is necessary to track the consumption hours for each machine. Additionally complicating the tracking aspect is the fact that one provider may have a plurality of servers, each of which could be running on a different software platform which would each require different tracking software. Moreover, given the rapidity of software upgrades for servers, it would be necessary to continually upgrade the tracking software programs as well. The amount of support needed to maintain one or more servers for serving a particular customer can also influence the billing approach. Finally, to be cost effective, a service provider seeks to maximize utilization of server resources, which results in servers doing work for more than one customer, further complicating the task of tracking utilization for billing. If, as often happens, a customer demands that a designated server be used exclusively for the tasks of a particular business unit, a utilization billing scheme is not profitable for the service provider, since a large percentage of the server resources go unused. For billing of small to large server services, the actual usage type and service level must be factored in to make the arrangement both profitable and affordable for the parties involved. In addition to factoring in the usage in the application environment, the service provider should seek to provide some valuation of the necessary support level and of the environmental characteristics, such as system size (measured in capacity units), in order to achieve a realistic valuation.

It is therefore an object of the present invention to provide a system and method for measuring and pricing the computer services provided by servers.

It is another object of the invention to establish a server valuation system which can dynamically be adjusted to evaluate service provided by newly developed server hardware and software.

It is yet another object of the invention to provide a server valuation system which can be applied to various levels of server size, application complexity and service requirements.

SUMMARY OF THE INVENTION

These and other objects are realized by the present invention comprising a server support matrix system and method for measuring and pricing information technology services provided by small, midrange and large servers. The inventive system and method assigns capacity units to server systems based on size and applies the capacity units to categorize server systems for valuation. In addition, the inventive system and method provides for taking into account server application complexity, in the assignment of a usage type category, and different levels of support services which can be provided by the service provider. The variables of capacity unit, usage type and support service level are combined in a Server Support Matrix and are assigned costs based on their location in the matrix. The matrix allows service providers and customers to readily ascertain prospective charges and to project costs for next-generation servers.

BRIEF DESCRIPTION OF THE DRAWINGS

The invention will now be described in greater detail with specific reference to the attached drawings wherein:

FIG. 3 illustrates a representative table linking server size in capacity unit ranges to capacity unit categories for use in the present system and method; and FIG. 4 provides a representative matrix applying the present invention.

DESCRIPTION OF THE PREFERRED EMBODIMENT

Figures 1, 2:
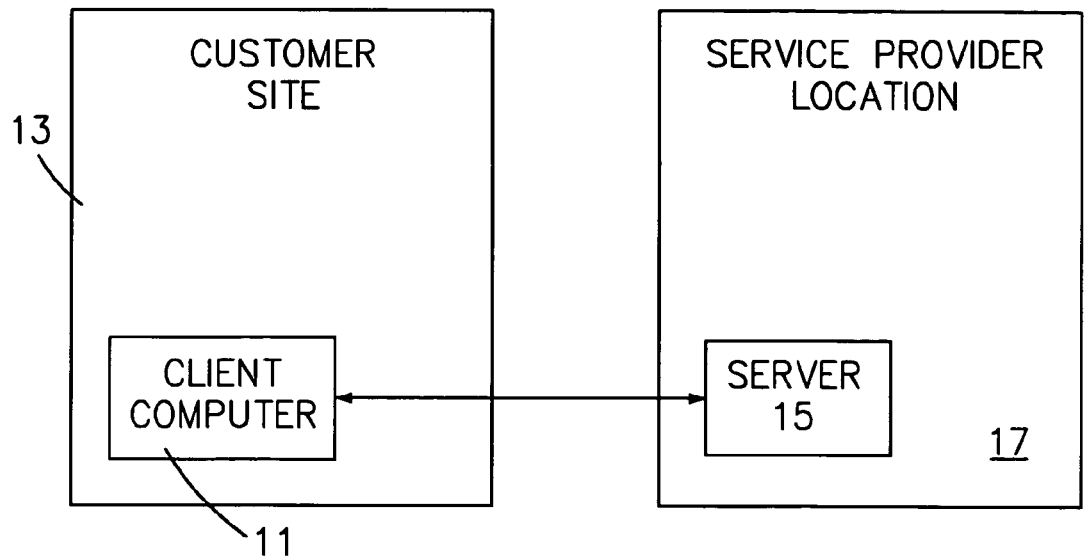
FIG. 1 illustrates a representative network wherein a service provider's servers perform customer's work.
FIG. 2 illustrates a representative Capacity Unit Table in accordance with the present invention.

It is to be noted that the ensuing description details the invention in the context of a service provider:customer arrangement. Since most operating units of a business are required to maintain their own internal profitability records, it is clear that the invention is applicable for establishing and tracking the value of services of servers for internal accounting purposes whether the servers and/or support services are provided "in-house", are provided by outside sources, or are provided by a combination of inside and outside sources.

Three key variables are utilized for determining the size and scope of support required by a client and thus in assigning a valuation for the provided services. The three key variables include the server system size (capacity unit), the server workload type (usage type), and the level of service support (service level). Once the system has assigned values for each of the variables, the values are inserted into the matrix, comprising a Support Service Rate Table, which allows a client to be able to select the level of support desired based upon the defined usage type and system size, as determined by Capacity Unit, in order to determine the cost of desired server services. Once the matrix has been mapped out, the costs can be calculated and inserted into the matrix automatically, and automatically updated as changes occur.

FIG. 1 illustrates one sample environment in which the valuation system and method of the present invention will be used. A client computer 11 at customer site 13 communicates with a server 15, which is physically located at a service provider site 17. Under such an arrangement, the service provider retains ownership of the server and simply provides the computational services to the customer. Maintenance of the server is done by the service provider. Alternative arrangements include the situation wherein the server, or a bank of servers, is located at the customer's site, but are still owned and maintained by the service provider. Yet another arrangement is the "in-house" situation noted above, wherein the customer site owns, operates and maintains its servers, but must nonetheless account for the services provided by and on behalf of its servers for internal asset review and accounting purposes.

The server system size is the first variable for which a value is assigned under the present invention. The "size" is represented in Capacity Units (CUs) which represent a measure of the specific server system's capacity to perform work. A Capacity Unit measures the relative server system performance across various make and model types and vendors based upon published benchmark results, such as those generated by SPEC, TPC and WINSTONE.

One can, for example, primarily use SPECfp95, with SPECint95 and SPECweb96 as secondary sources, or such other subsequent primary and secondary and equivalent sources as the benchmarking methodology to determine capacity units (see, e.g., http://www.spec.org/). For speed measurement, for example, the results ("SPEC Ratio" for each individual benchmark) are expressed as the ratio of the wall clock time to execute one single copy of the benchmark, compared to a fixed "SPEC reference time". For the CPU95 benchmarks, a Sun SPARCstation 10/40 can be chosen as the reference machine. As is apparent from results publications, the different SPEC ratios for a given machine can vary widely. SPEC encourages the public to look at the individual results for each benchmarks. Users should compare the characteristics of their workload with that of the individual SPEC benchmarks and consider those benchmarks that best approximate their jobs. However, SPEC also recognizes the demand for aggregate result numbers and has defined the integer and floating-point averages. The following averages have been defined for speed measurements with the CPU95 benchmarks: SPECint_base95 geometric mean of the 8 SPEC ratios from CINT95 when compiled with conservative optimization for each benchmark; SPECfp_base95 geometric mean of the 10 SPEC ratios from CFP95 when compiled with conservative optimization for each benchmark; SPECint95 geometric mean of the 8 SPEC ratios from CINT95 when compiled with aggressive optimization for each benchmark; SPECfp95 geometric mean of the 10 SPEC ratios from CFP95 when compiled with aggressive optimization for each benchmark. For a more detailed explanation about the difference between conservative ("baseline") and aggressive ("peak") optimizations, see below.

The CU becomes a standard value for server comparison and is maintained in a Capacity Unit Table as depicted in FIG. 2. The table contains an entry, 21, for the manufacturer of the system, an entry 23 for the particular system being evaluated including the number of CPUs, and an entry 25 for the Capacity Unit (CU) assigned for that system. The CU values are either the published benchmark ratio results or, where a common benchmark does not exist, a benchmark ratio calculated using a defined process, which is further detailed below.

Calculations for Capacity Units are primarily derived from the Standard Evaluation Performance Company's, (SPEC), using SPEC Floating Point (SPECfp95) benchmarks. Floating Point—a class of arithmetic typically used in scientific applications. (See Appendix A—Terms). It is clear that an alternative benchmarking standard can be adopted for use with the present invention, provided that the standard is used consistently when assigning CU values for each system.

Detailed below is a representative process flow for the CU determination of the present invention:

Step 1. Find the make/model and number of processors in the CU database for the Server being loaded.

Step 2. If the make/model is not in the CU database or the number of processors is different for a current make/model, a new CU must be determined. This determination is made by following Steps 3–6.

Step 3. Go to the SPEC Website and see if new information has been published for the machine in question.

Step 4. If the Make/Model is not available from the SPECfp95, SPEC Integer (SPECint95) and SPEC WEB (SPECweb96) are used as secondary and tertiary data sources.

Step 5. If there are no benchmarks from the above sources, an estimate of like servers that have similar chip sets is used. If this cannot be determined for the make and model, one may call the sales representative and ask if he/she has any Benchmark information for the machine in question.

Step 6. If none exist, ask the representative for their recommendation on what benchmarks for similar machine should be used to make this determination.

Step 7. Update Make/Model lookup table.

Step 8. Update CU Table in Server Inventory Repository (SIR) Database.

Step 9. Create matrix using CU values, usage types and service levels (or update matrix if one exists).

Step 10. Calculate (or update) costs based on said CU update.

The latter updating step will be conducted not only when a server has been added or changed but also when the services to be performed are changed (resulting in a change to the usage category entries) or when a different service level is created, as further detailed below.

For a practical implementation for use over an extended server/services contract period, it is advantageous to create the table at the time of commencement of the contract, followed by updating the information on a regular schedule (e.g., every 6 months thereafter) or whenever a new server is added to the system.

In order to simplify the process of quantifying the pricing for server support, and to simplify the categorization of same, under the present invention, the Capacity Units for different sized servers are grouped as shown in FIG. 3. One example of how servers can be categorized into Capacity Unit ranges is as follows. Servers with a Capacity Unit range from 0.1 to 9.9 are assigned to Capacity Unit Category (hereinafter "CUC") 1; servers with a CU range from 10–49.9 are assigned a CUC of 2; servers with a CU range from 50–99.9 fall into the CUC of 3; servers with a CU range from 100–249.9 are placed in CU Category 4; and, servers with a CU range from 250–400 are considered to be in the CUC of 5. The Capacity Unit ranges can vary depending on the customer's server environment (e.g., # of small, medium or large sized servers). If a customer has a large quantity of small servers (CU 1), very few medium sized servers (CU 2 & 3) and no large servers (CU 4 & 5), you may reduce the range for CU 1, 2 and CU 3 so that more of the servers fall into a broader range of charges. As new servers are introduced into the marketplace, the CUC list of categories can be expanded to assign CUC values to larger servers with greater CU values.

For those systems which have not been benchmarked by outside entities, a Capacity Unit can be estimated based on available information. For example, in the illustrated table, a SPEC number or other outside benchmark was not available for the ServerA#6 model (6 CPUs). Since the machine lies between the 4 CPU model which has a CU of 20.67 and the 8 CPU model which has a CU of 40.33, a CU value for the system having 6 CPUs can be obtained by averaging the CU values for the two related systems. Thus, a CU of 30.5 would be obtained.

Another method for obtaining a CU value would be to consult the manufacturer specifications to determine how the machine is categorized by the manufacturer. If the machine is described as "large capacity", one can assign a CU equal to that assigned to another large capacity machine by the same manufacturer. While estimating in this way can be risky, it is preferable to the alternative of failing to factor in any Capacity Unit estimate when evaluating a system.

The next variable for which a value is assigned under the present invention is the server workload type, as categorized by usage. Usage type categorizes servers based upon the primary purpose for which they are to be deployed within a client enterprise. Usage Type groups servers with similar application characteristics and support requirements, where support means so-called "internal", application-provided support. Usage Types can be defined to fit a particular client's environment. Each Usage Type is associated with a set of designated automatic services (e.g., server operations, backup and recovery, maintenance, etc.) which are specific to the type of workload that is run on the server. In the Server Support Matrix shown in FIG. 4, the following application environments are classified into three standard usage categories:

Type A including:
Database Management Servers (DMBMS) for
batch and/or interactive on-line transactions; and
Production Applications;
Type B including:
Application servers;
E-Mail servers;
Development servers;
Software Management System (SMS) servers;
Test servers; and
Infrastructure servers; and
Type C including:
Distributed File servers;
Print servers;
Primary/Backup Domain servers;
WINS servers;
Winframe servers;
Name servers;
Dynamic Host Configuration Protocol (DHCP) servers; and
Web servers;

where the types are effectively ranked with Type A having the "highest" level, Type B having the next highest level, and Type C having the lowest level of application complexity and automatic (i.e., application-provided) support requirements. For any "multiple use" server which has two or more application environments on the same server, the server is categorized into the Type representing the highest level of application which is installed on that server.

The final variable which affects the valuation of services provided by and on behalf of a server system is the type of Service Support Level, representing the amount of so-called "external" service which the service provider must allocate to that server or server system. For the service provider: the Service Support Level is clearly tied to the amount, type and skill of the technical resources which must be made available to the customer when providing the agreed-upon service; while for the "in house" situation the asset allocation becomes less readily defined. The type of Support Service Level is generally selected to fit a particular client's needs. Normal coverage options include the following:

Basic: 5×9 hours of operation; server maintenance provided by the client;
Standard: 5×9 hours of operation; 4-hour on-site response; 7×24 hours call-in support;
Enhanced: 7×24 hours of operation; 4-hour on-site response; 7×24 hours telephone support; and
Premium: 7×24 hours of operation; 2-hour on-site response; 7×24 hour telephone support.

For purposes of the present invention, the Support Service level can be stated as "Basic, Standard, Enhanced or Premium" (as depicted in FIG. 4); or, alternatively, each level can be assigned an alphabetical or numerical value for use in the matrix.

Once the values have been determined for the CU category, the matrix shown in FIG. 4 is created. For each CU category, a monthly charge in dollars is defined for each usage type given the chosen support level. The matrix allows a client to be able to select the level of support desired based upon the defined usage type and server system size, as determined by Capacity Unit (CU). The matrix and its use enables clients to prepackage services into understandable and easy to administer price table. Each price is the monthly, or optionally the annual, charge for the hardware (if applicable), software, and associated external services for each server installed in the client environment. The total charges for the enterprise can be determined by multiplying the quantity of installed servers, as categorized in the matrix, by the price for that installed server. With this model, client users can predict what their costs will be and the client can more easily implement "charge back" throughout the enterprise. As noted above, the costs can be automatically calculated one the matrix has been defined. Moreover, when changes to the service and/or server system occur, the matrix and costs can be automatically updated to reflect any changes or additions to the capacity units, usage types, or service levels.

By use of the present invention, the "value" of server resources and services can be readily quantified and tracked. The variables of capacity unit, usage type and support service level are combined in a Server Support Matrix and are assigned costs based on their location in the matrix, which allows service providers and customers to readily ascertain prospective charges and to project costs for next-generation servers. While the invention has been described with specific reference to several preferred embodiments, it will be apparent to one of skill in the art that certain modifications and adaptations can be made without departing from the spirit and scope of the invention as set forth in the appended claims.

What is claimed is:

1. A method for a computer processor to provide automatic valuation of server-based computer services for each of a plurality of computer server systems comprising the steps of:

assigning a capacity value for each of a plurality of computer server systems;

assigning a usage category for each of said plurality of server systems;

mapping said capacity value and usage category into a matrix;

automatically assigning costs for server-based computer services based on location within said matrix;

ascertaining at least one service support level for said computer services;

mapping each of said at least one service support level into said matrix;

assigning costs for each of said at least one support level in said matrix; and further comprising the steps, for a specific request for server-based computer services, of:

determining, by said computer processor, the required usage type, required capacity, and required support level for satisfying said request; and automatically determining, by said computer processor, charges for requested server-based computer services by aggregating the assigned costs for services from said matrix based on said required usage type, required capacity, and required support level.

2. The method of claim 1 wherein said assigning of a capacity value comprises assigning a value based on the size of the server system.

3. The method of claim 1 wherein said assigning of a capacity value comprises assigning a value based on the number of CPUs in said server system.

4. The method of claim 1 wherein said assigning of a capacity value comprises assigning the value based on published standards for each server.

5. The method of claim 1 further comprising calculating a capacity value from at least one previously-assigned capacity value.

6. The method of claim 1 wherein said assigning of a usage category is based on the server application to be executed at each of said plurality of servers.

7. A program storage device readable by machine, tangibly embodying a program of instructions executable by the machine to perform method steps for a computer processor to provide automatic valuation of server-based computer services for each of a plurality of computer server systems said method steps comprising:

assigning a capacity value for each of a plurality of computer server systems;

assigning a usage category for each of said plurality of server systems;

mapping said capacity value and usage category into a matrix; and automatically assigning costs for server-based computer services based on location within said matrix;

ascertaining at least one service support level for said computer services;

mapping each of said at least one service support level into said matrix;

assigning costs for each of said at least one support level in said matrix; and wherein said method further comprises the steps, for a specific request for server-based computer services, of:

determining the required usage type and required capacity for satisfying said request; and automatically determining charges for requested server-based computer services by aggregating the assigned costs for services from said matrix based on said required usage type required capacity and requested support level.

* * * * *